United States Patent [19]
Kawagishi et al.

[11] Patent Number: 5,414,542
[45] Date of Patent: May 9, 1995

[54] LIQUID CRYSTAL APPARATUS

[75] Inventors: Hideyuki Kawagishi, Fujisawa; Takashi Enomoto, Zama; Hirofumi Iwamoto, Hiratsuka, all of Japan

[73] Assignee: Canon Kabushiki Kaisha, Tokyo, Japan

[21] Appl. No.: 985,232

[22] Filed: Dec. 2, 1992

Related U.S. Application Data

[63] Continuation of Ser. No. 374,659, Jun. 30, 1989, abandoned.

[30] Foreign Application Priority Data

Jul. 1, 1988 [JP] Japan .................. 63-165660

[51] Int. Cl.6 .............................................. G02F 1/13
[52] U.S. Cl. .................................. 359/48; 359/50
[58] Field of Search .............. 350/350 S; 359/48, 49, 359/50

[56] References Cited

U.S. PATENT DOCUMENTS

| | | | |
|---|---|---|---|
| 4,556,288 | 12/1985 | Sekimura | 350/339 |
| 4,660,936 | 4/1987 | Nosker | 359/48 |
| 4,737,018 | 4/1988 | Iwashita et al. | 350/339 |
| 4,763,995 | 8/1988 | Katagiri et al. | 350/350 S |
| 4,813,771 | 3/1989 | Handschy et al. | 359/42 |
| 4,870,484 | 9/1989 | Sonehara | 359/50 |
| 4,917,471 | 4/1990 | Tarao et al. | 350/350 S |
| 4,976,514 | 12/1990 | Murata et al. | 350/345 |
| 5,008,789 | 4/1991 | Arai et al. | 313/486 |

FOREIGN PATENT DOCUMENTS

| | | | |
|---|---|---|---|
| 58-52618 | 3/1983 | Japan | 350/339 R |
| 59-58421 | 4/1984 | Japan . | |
| 59-202435 | 11/1984 | Japan . | |
| 62-194280 | 8/1987 | Japan | 350/345 |
| 63-6526 | 1/1988 | Japan | 359/50 |
| 63-48522 | 3/1988 | Japan . | |

*Primary Examiner*—Sara W. Crane
*Attorney, Agent, or Firm*—Fitzpatrick, Cella, Harper & Scinto

[57] ABSTRACT

A liquid crystal apparatus includes a liquid crystal cell comprising a pair of substrates each having thereon a transparent electrode with a thickness of 840 Å or less, 1320–1680 Å, 1960–2470 Å or 3180–3850 Å, and a liquid crystal layer disposed between the pair of substrates in a thickness of 10 microns or less; and a fluorescent light source comprising at least two types of fluophors having different emission peak wavelengths. The liquid crystal may preferably be a ferroelectric liquid crystal having a thickness of 5 microns or less. A dielectric film of, e.g., $Ta_2O_5$ or $TiO_2$ having a larger refractive index than the transparent electrode may be disposed.

12 Claims, 12 Drawing Sheets

LIQUID CRYSTAL APPARATUS

This application is a continuation of application Ser. No. 374,659, filed Jun. 30, 1989, now abandoned.

FIELD OF THE INVENTION AND RELATED ART

The present invention relates to a liquid crystal apparatus using a liquid crystal, particularly a ferroelectric liquid crystal apparatus with suppressed color irregularity.

Clark and Lagerwall have disclosed a surface-stabilized bistable ferroelectric liquid crystal in Applied Physics Letters, Vol. 36, No. 11 (Jun. 1, 1980), p.p. 899–901, and U.S. Pat. Nos. 4,367,924 and 4,563,059. The bistable ferroelectric liquid crystal has been realized by disposing a chiral smectic liquid crystal between a pair of substrates which are set to provide a spacing small enough to suppress the formation of a helical arrangement of liquid crystal molecules inherent to the bulk chiral smectic phase of the liquid crystal and aligning vertical molecular layers each composed of a plurality of liquid crystal molecules in one direction.

The transmittance through an actual ferroelectric liquid crystal cell is, however, not sufficiently large, so that a backlight of a high luminance has been required for a display.

As a high-luminance light source, there has been known a light source giving a sharp peak of specific emission energy (%), particularly a fluorescent light source comprising at least two types of fluophors or fluorescent substances having different emission peak wavelengths (e.g., "FL40SS-EX 37S" available from Toshiba K.K. giving a spectral emission characteristic as shown in FIG. 9). When such a light source is used as a backlight for a ferroelectric liquid crystal panel as described above, there have been caused problems, such as occurrence of color irregularity due to an uneven thickness of a liquid crystal layer and occurrence of changes in hue over the entire panel face corresponding to changes in viewing directions.

SUMMARY OF THE INVENTION

An object of the present invention is, in view of the above problems, to provide a ferroelectric liquid crystal apparatus preventing the occurrence of color irregularity or change in hue while maintaining a bright display state.

According to an aspect of the present invention, there is provided a liquid crystal apparatus comprising: a liquid crystal cell comprising a pair of substrates each having thereon a transparent electrode with a thickness of 840 Å or less, 1320–1680 Å, 1960–2470 Å or 3180–3850 Å, and a liquid crystal layer disposed between the pair of substrates in a thickness of 10 microns or less, particularly 5 microns or less; and a fluorescent light source comprising two types of fluophors having different emission peak wavelengths.

According to a second aspect of the present invention, there is provided a liquid crystal apparatus, comprising: a liquid crystal cell comprising a pair of substrates each having thereon a transparent electrode and a dielectric film having a larger refractive index than the transparent electrode, and a liquid crystal layer disposed between the pair of substrates in a thickness of 10 microns or less, particularly 5 microns or less; and a fluorescent light source comprising at least two types of fluophors having different emission peak wavelengths.

According to a third aspect of the present invention, there is provided a liquid crystal apparatus, comprising: a liquid crystal panel comprising a pair of substrates each having thereon a transparent electrode and a liquid crystal layer disposed between the pair of substrates, and a light source, the liquid crystal layer having a maximum thickness Dmax and a minimum thickness Dmin; wherein the liquid crystal panel in combination with the light source provides an angle $|\Delta\theta_{uv}|$ of 9 degrees or less, preferably 3 degrees or less, wherein the angle $|\Delta\theta_{uv}|$ is defined as an angle formed between a line connecting a coordinate original and a chromaticity point defined by coordinates u* and v* at the point of the maximum liquid crystal layer thickness and a line connecting the coordinate original and a chromaticity point defined by coordinates u* and v* at the point of the minimum liquid crystal layer thickness, respectively, on a u*-v* coordinate system according to the CIE 1976 (L*u*v*) Space.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
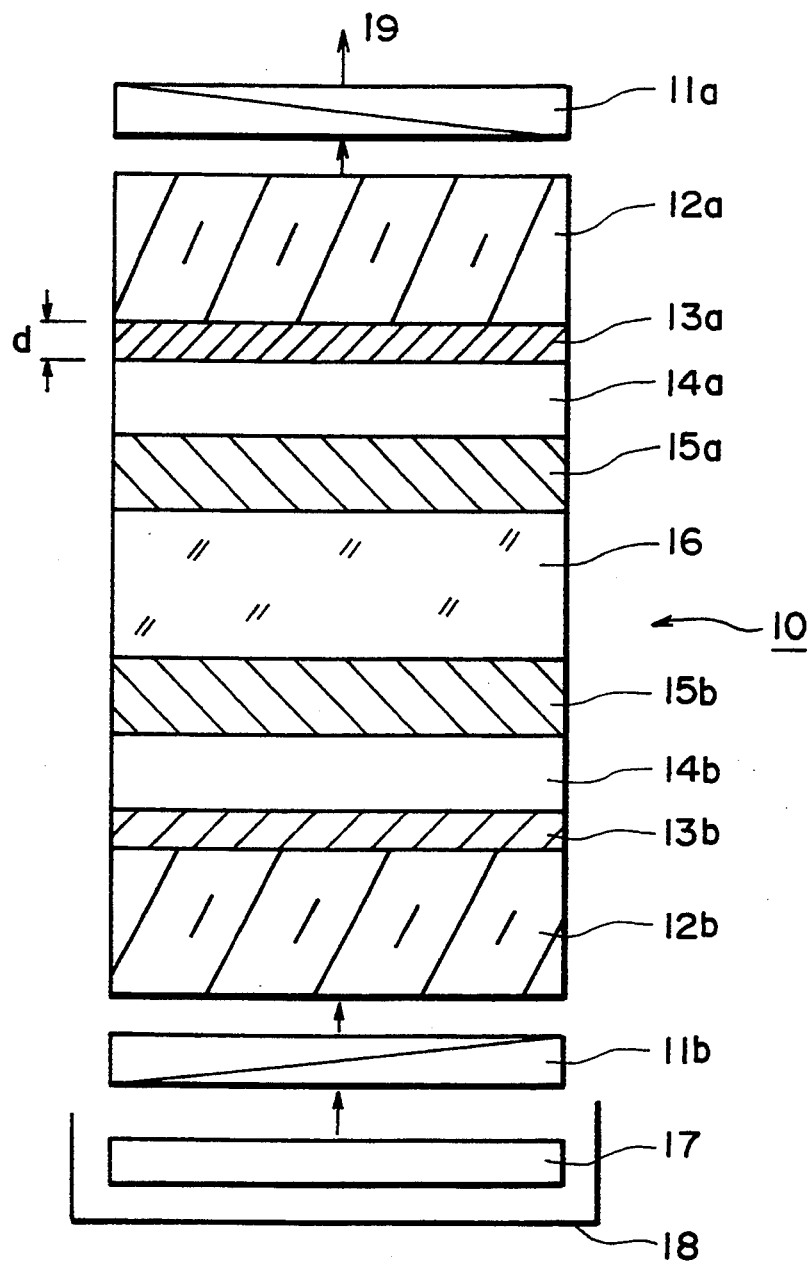
FIG. 1 is a schematic sectional view of an apparatus according to the present invention.
Figure 2:
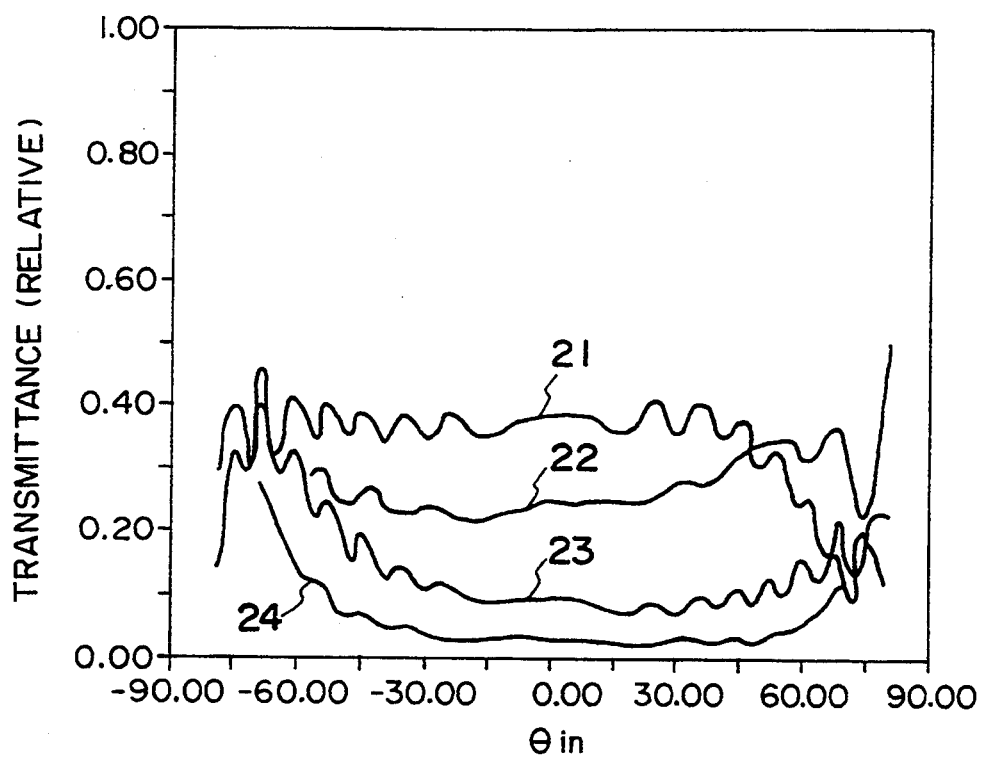
FIGS. 2 to 7 show changes in transmittances of a prior art cell due to changes in a direction of observation.
Figure 3:
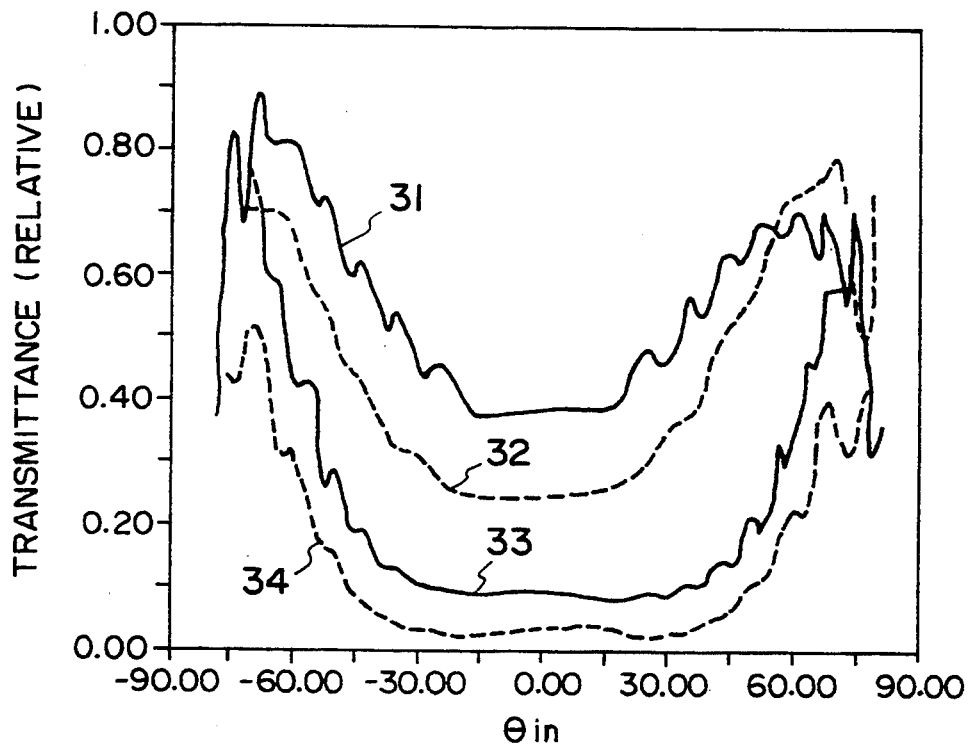
Figure 4:
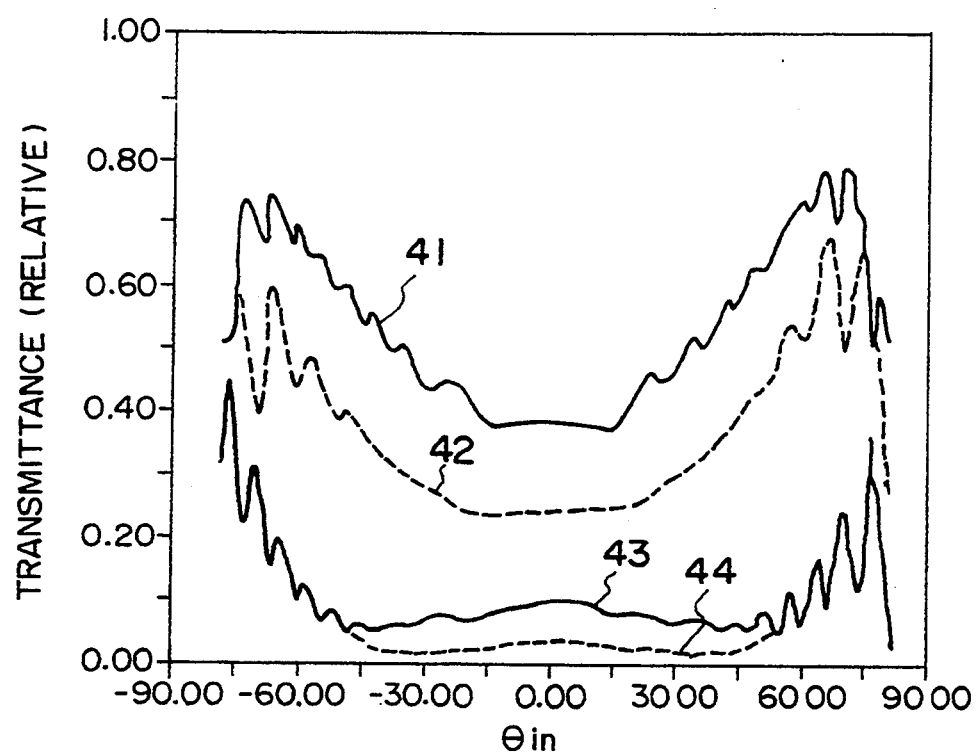
Figure 5:
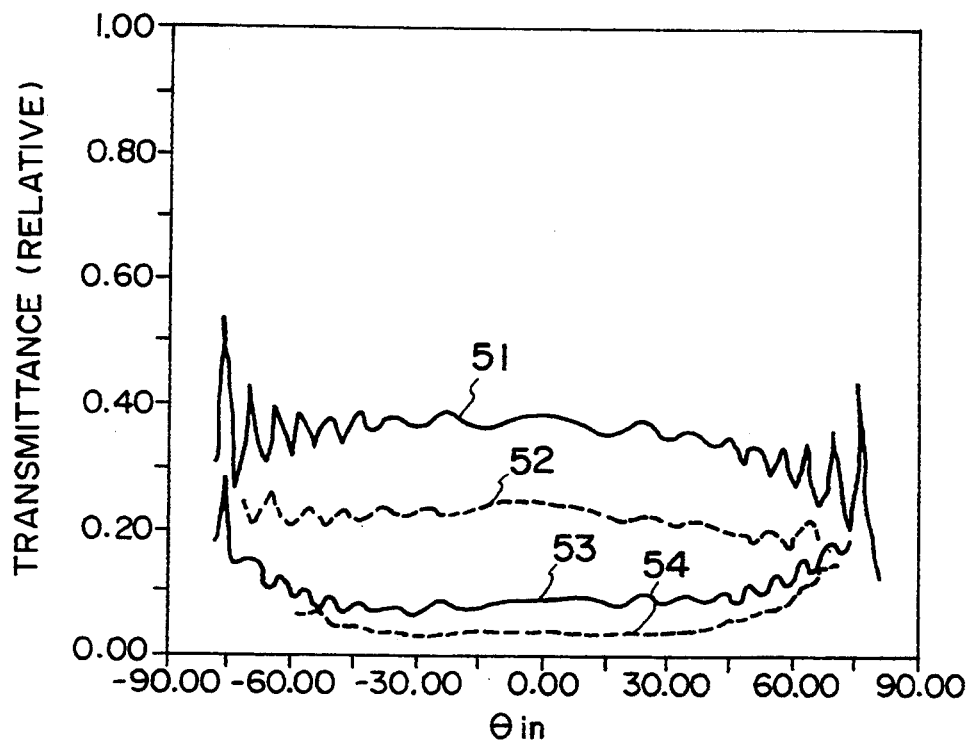
Figure 6:
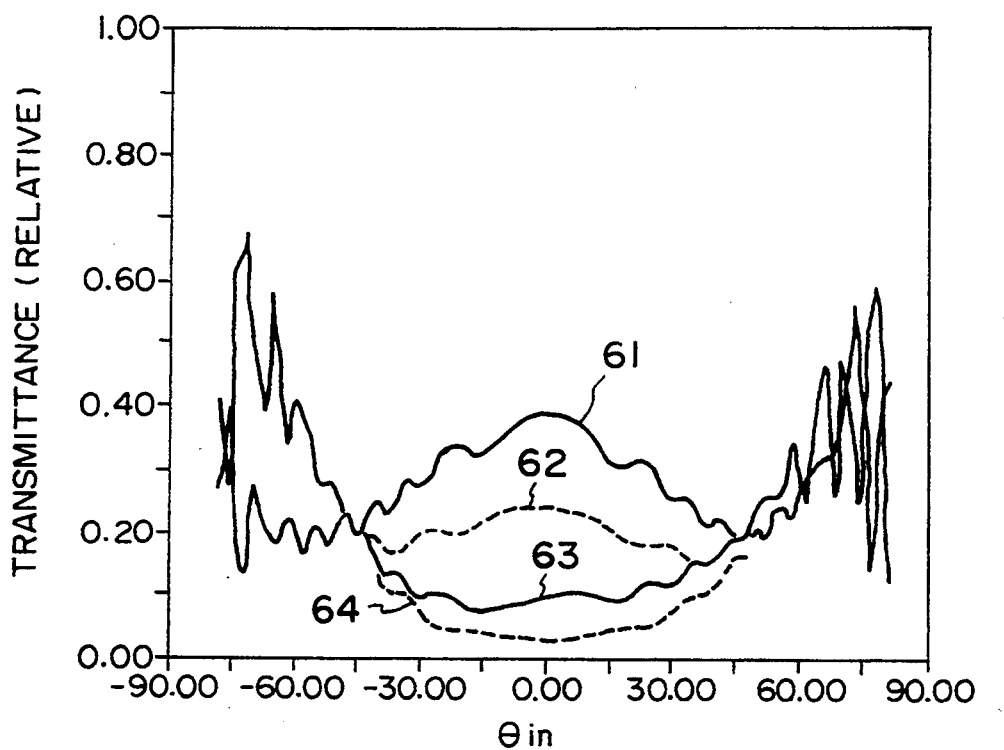

FIG. 1 is a schematic sectional view of an apparatus according to the present invention including a ferroelectric liquid crystal cell 10. The cell 10 comprises two glass substrates 12a and 12b having thereon transparent electrodes 13a and 13b, dielectric films 14a and 14b, and alignment films 15a and 15b, respectively, and a ferroelectric liquid crystal 16 disposed between the two substrates 12a and 12b. On both sides of the ferroelectric liquid crystal cell 10, polarizers 11a and 11b are disposed in a cross nicol relationship. Behind the polarizers are disposed a backlight 17 and a reflection plate 18 so as to provide transmitted light 19 through the cell 10.

FIGS. 2 through 7 illustrate the changes in transmittance through a cell A having such a cell structure as shown in FIG. 1 and having the following dimensions corresponding to the changes in direction of observation.

Cell A

Substrates 12a, 12b:
  1.1 mm-thick glass plates
Transparent electrodes 13a, 13b:
  1150 Å-thick film of ITO (refractive index=1.92)
Dielectric films 14a, 14b:
  450 Å-thick film of SiO$_2$ (refractive index=1.47)
Alignment films 15a, 15b:
  600 Å-thick film of polyimide (refractive index=1.67)
Ferroelectric liquid crystal 16:
  averagely 1.5 micron-thick layer of CS-1014 (available from Chisso K.K. $n_\perp=1.55$, $n_\parallel=1.70$; maximum tilt angle=20 degrees, tilt angle in the cell under no electric field=8 degrees, pre-tilt angle in SmA phase≈0 degree.
Polarizers 11a, 11b:
  disposed in right angle cross nicols so as to provide the darkest state under no electric field.

Figure 7:
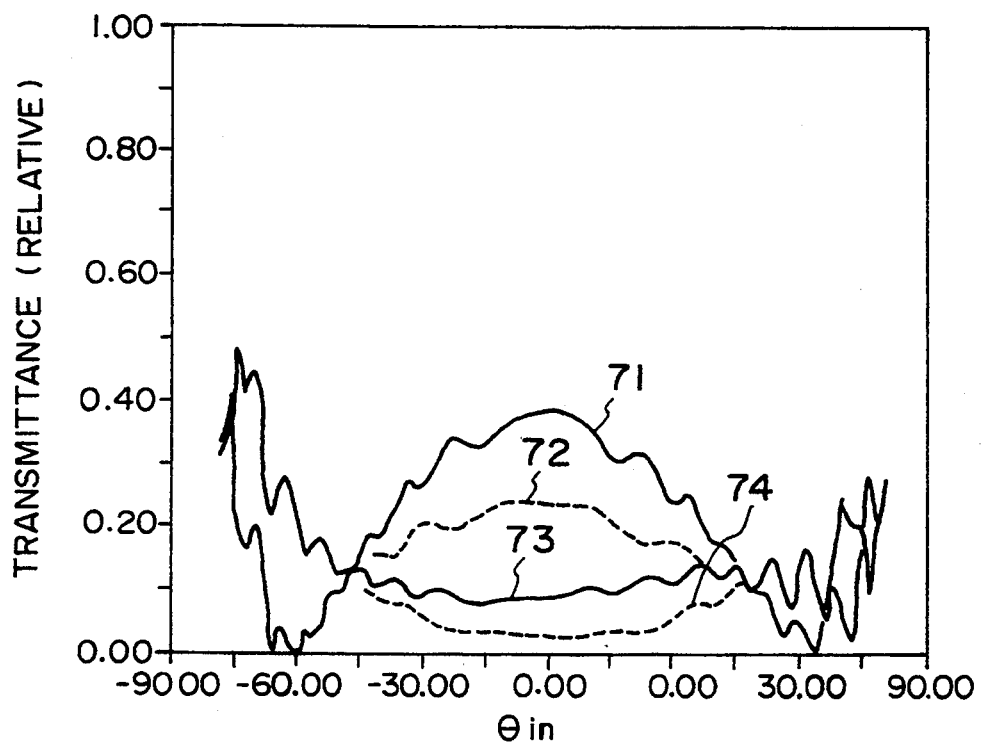

The changes in observation direction are summarized in the following Table 1 along with identification of curves in FIG. 7 with reference to FIGS. 8A and 8B.

TABLE 1

| No. of FIG. | $\Theta_{samp}$ | Bright state | | Dark state | |
|---|---|---|---|---|---|
| | | 450 nm (blue) | 630 nm (red) | 450 nm (blue) | 630 nm (red) |
| 2 | 0° | curve 21 | curve 22 | curve 23 | curve 24 |
| 3 | 30° | curve 31 | curve 32 | curve 33 | curve 34 |
| 4 | 60° | curve 41 | curve 42 | curve 43 | curve 44 |
| 5 | 90° | curve 51 | curve 52 | curve 53 | curve 54 |
| 6 | 120° | curve 61 | curve 62 | curve 63 | curve 64 |
| 7 | 150° | curve 71 | curve 72 | curve 73 | curve 74 |

Figure 8A:
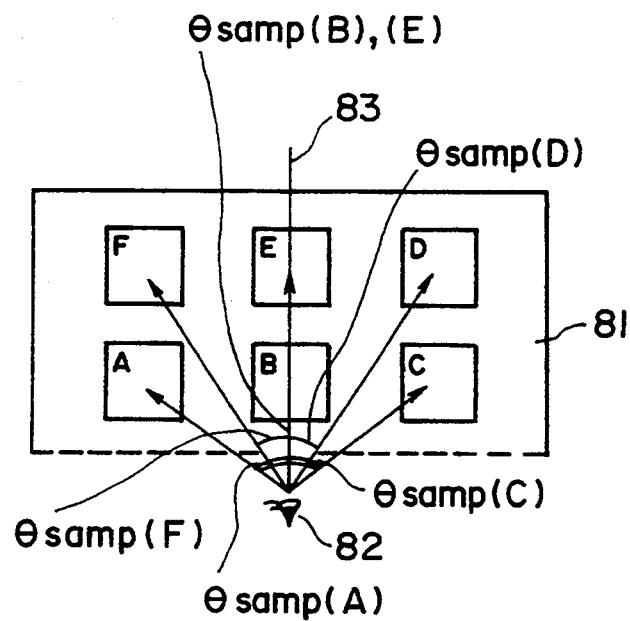
FIG. 8A is a schematic plan view of a liquid crystal cell for explanation of an angle $\theta_{samp}$.
Figure 8B:
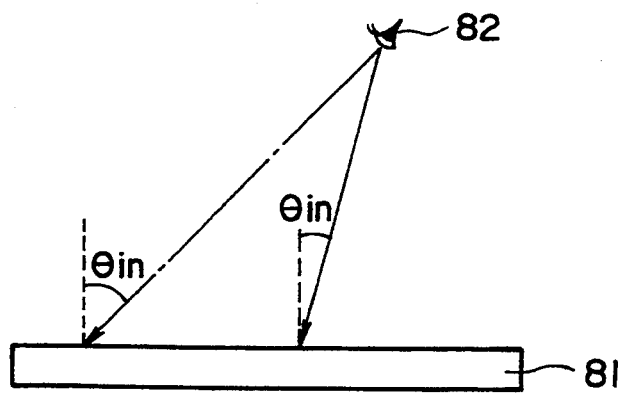
FIG. 8B is a corresponding side view for explanation of an angle $\theta_{in}$.

More specifically, FIG. 8A is a plan view illustrating a ferroelectric liquid crystal panel 81 placed horizontally and observed from an observation eye 82. On the panel 81, noted picture regions A–F are shown. A direction 83 is defined as the horizontal component of an observation direction passing along the center of the picture from the observation eye 82 placed at an ordinary observing position. Angles $\theta_{samp}$ (A)–(F) are defined as angles of the horizontal directions from the observation eye to the noted regions A–F, respectively, with respect to the horizontal direction 83. FIG. 8B is a side view corresponding to FIG. 8A and shows an angle $\theta_{in}$ defined as an angle of the vertical component of an observation direction from the observation eye 82 to a noted region with respect to a normal to the ferroelectric liquid crystal panel 81.

FIGS. 2 to 7 show that such a ferroelectric liquid crystal panel having 1150 Å-thick ITO transparent electrodes 13a and 13b causes color irregularity due to changes in angles $\theta_{samp}$ and $\theta_{in}$ because it provides different transmittances for blue light (450 nm) and red light (632 nm).

Figure 9:
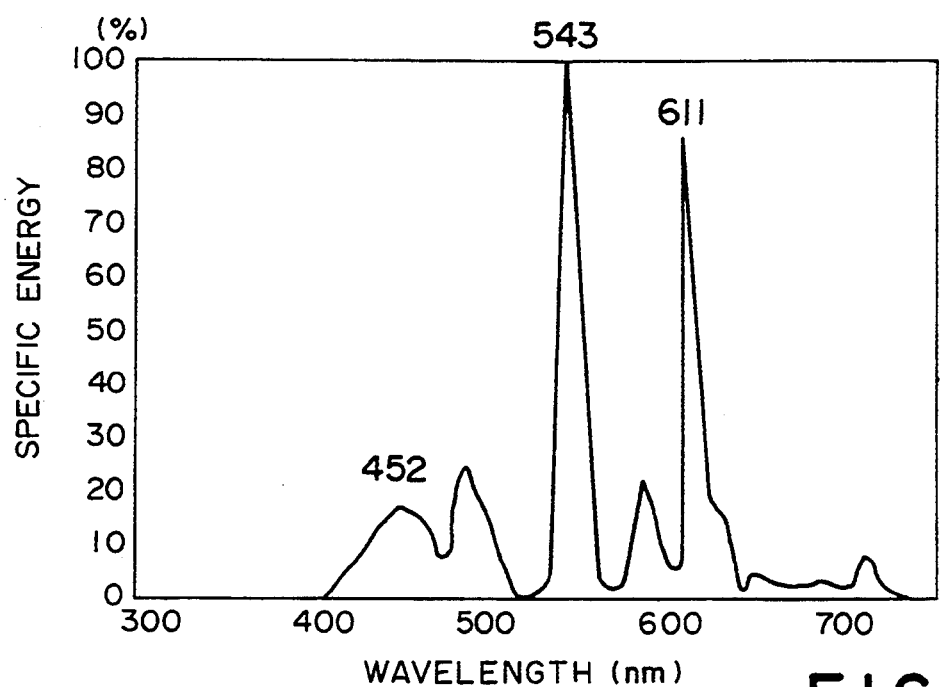
FIG. 9 is a diagram showing the spectral emission characteristic of a 3-wavelength light source.

According to the present invention, however, it has become possible to suppress the occurrence of such color irregularity attributable to multiple interference under irradiation from a three-wavelength light source having a spectral emission characteristic as shown in FIG. 9 by using a transparent electrode of preferably ITO (indium-tin-oxide) having a thickness of 840 Å or less (particularly 720 Å or less but practically 50 Å or more), 1320–1680 Å, 1960–2470 Å or 3180–3850 Å for a transparent electrode 13a and/or a transparent electrode 13b.

In a preferred embodiment of the present invention, the glass substrates 12a and 12b are caused to have a refractive index n satisfying a relationship of:

$$n_\perp - 0.1 \leq n \leq n_\parallel + 0.1,$$

wherein $n_\perp$ and $n_\parallel$ denote the refractive indices along the shorter (minor) molecular axis and longer (major) molecular axis, respectively, of a liquid crystal used as measured by the optical interference method. In this instance, it is further preferred that the dielectric films 14a and 14b and the alignment films 15a and 15b also have a similar refractive index, i.e., a value n satisfying the above relationship.

Figure 10:
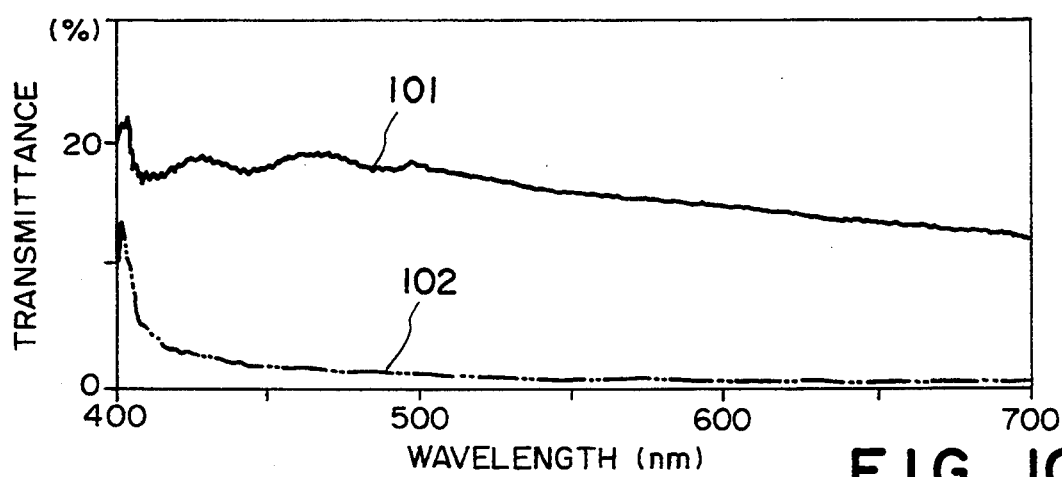
FIGS. 10 and 11 show spectral transmission characteristic curves for an apparatus of the present invention and a comparative example apparatus, respectively.

FIG. 10 is a graph showing spectral transmittances in bright and dark states under the condition of $\theta_{in}=0$ degree through a ferroelectric liquid crystal cell B having a cell structure as shown in FIG. 1 and the same dimensions as the above-mentioned cell A except for the thickness of the ITO electrodes 13a and 13b was changed to 100 Å. The transmittance curve 101 represents one in the bright state and the curve 102 represents one in the dark state.

Figure 11:
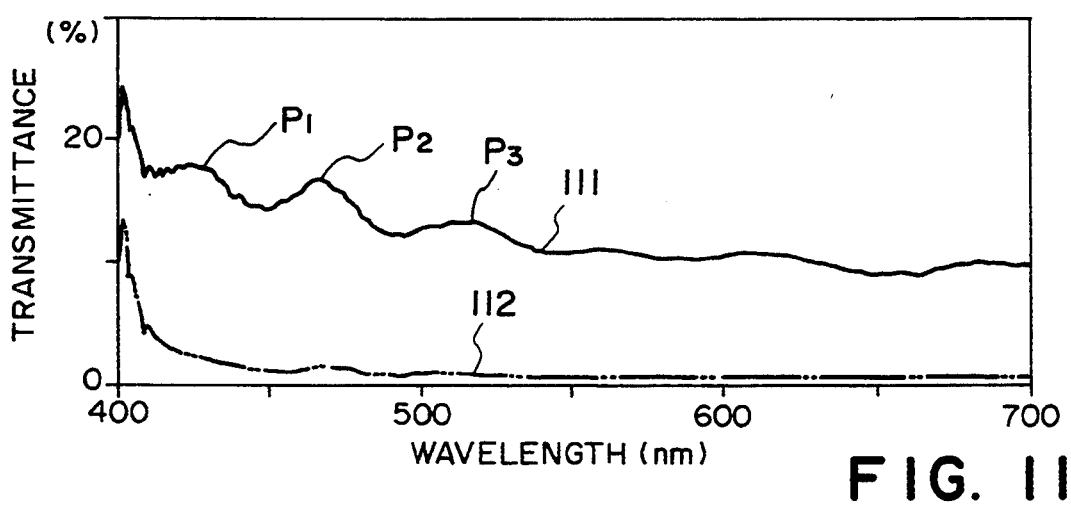

FIG. 11 shows the corresponding spectral transmittance in bright and dark states of the comparative ferroelectric liquid crystal cell A described above. The curve 111 represents the transmittance in the bright state and the curve 112 illustrates one in the dark state.

In view of FIGS. 10 and 11 in comparison, the transmittance curve 111 of Cell A in FIG. 11 provides a remarkable peaks $P_1$, $P_2$, $P_3$, ... at intervals of 20–50 nm showing a fluctuation in transmittance compared with the curve 101 of Cell B in FIG. 10.

The above-mentioned Cells A and B were respectively provided with a backlight (FL40 SS-EX 37-S) having a spectral emission characteristic as shown in FIG. 9 and subjected a panel test wherein the occurrence of color irregularity under illumination from the backlights was evaluated by arbitrarily selected 20 panelists while variously changing the values of $\theta_{in}$ and $\theta_{samp}$. As a result, the Cell A was judged to cause a color irregularity by 18 of the 20 panelists, whereas the Cell B was judged to be free from color irregularity by 19 of the 20 panelists.

Figure 12:
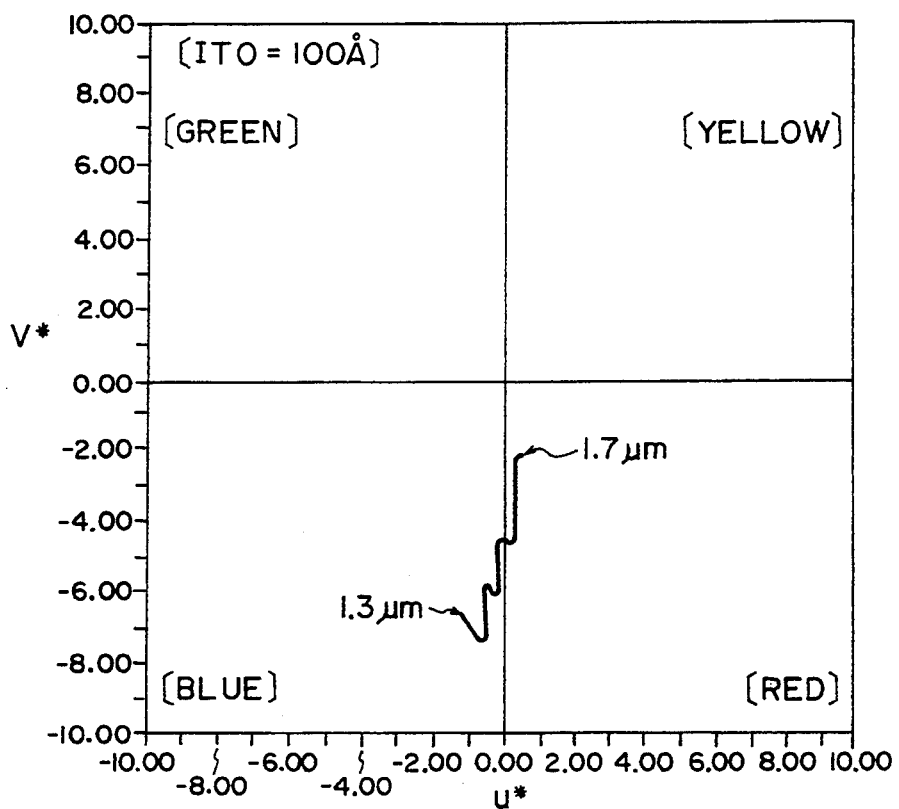
FIG. 12 is a chromaticity diagram on a u*-v* coordinate system showing a locus of chromaticity points varying depending on changes in thickness of the liquid crystal layer of an apparatus of the present invention.
Figure 13:
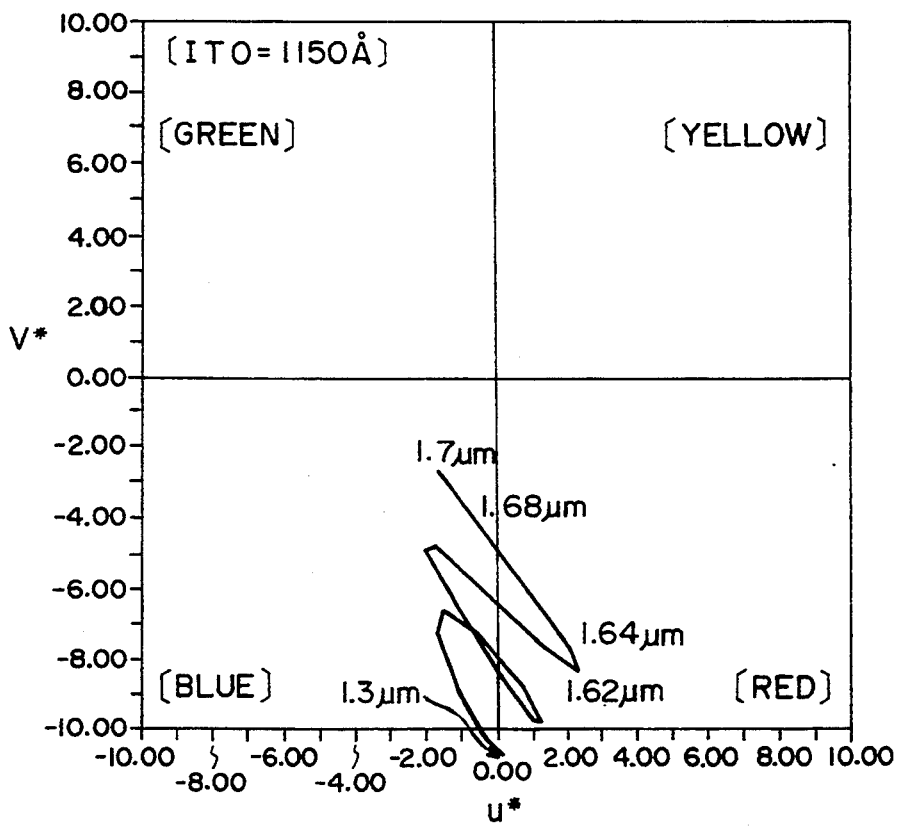
FIG. 13 is a corresponding chromaticity diagram for a comparative apparatus.

FIG. 12 is a chromaticity diagram on the u*-v* coordinate system according to the CIE 1976 (L*u*v*) Space (JIS Z8729-1980) showing the changes of chromaticity points corresponding to changes in liquid crystal layer thickness for a type of Cell B. More specifically, a cell having a structure basically the same as the above-mentioned Cell B but having a relatively large fluctuation in liquid crystal layer thickness was provided. Points having liquid crystal layer thicknesses of 1.3 micron, 1.4 micron, 1.5 micron, 1.6 micron and 1.7 micron were identified by using a Berek compensator, and the u* and v* coordinates at respective thickness portions were measured under the condition of $\theta_{in}=0$ by means of a luminance meter (e.g., "BM-7" available from Tokyo Kogaku Kikai K.K.) according to the CIE 1976 (L*u*v*) Space while "white" of the standard light C (JIS Z8720) was taken at the coordinate original. FIG. 13 is a similar chromaticity diagram obtained with respect to a type of Cell A.

Figure 14:
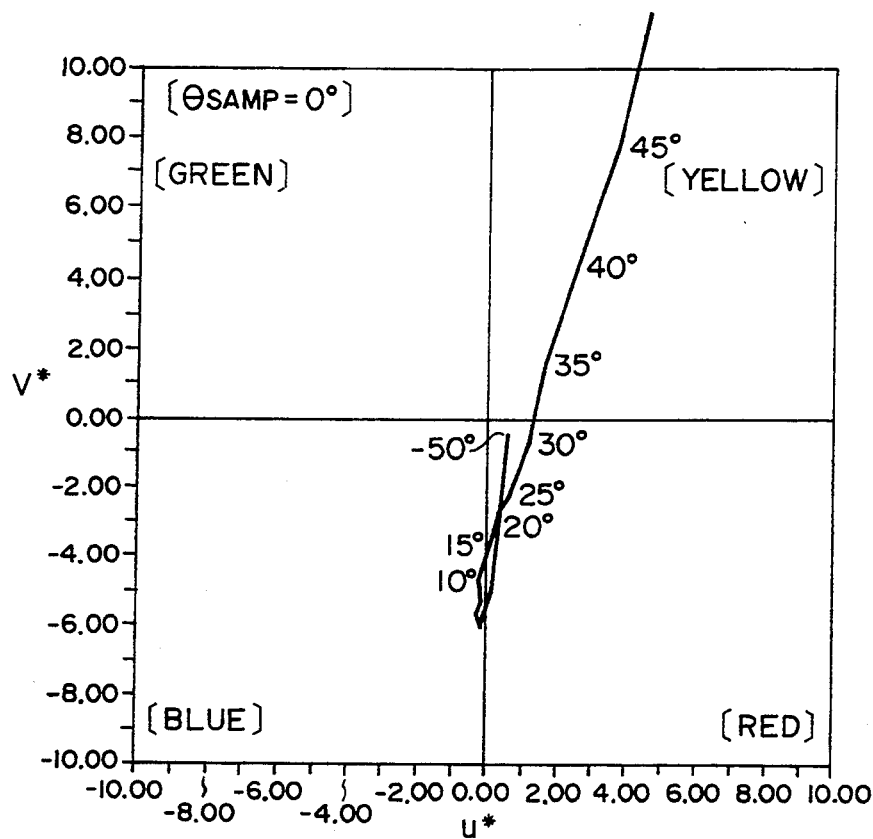
FIG. 14 is a chromaticity diagram on a u*-v* coordinate system showing a locus of chromaticity points varying depending on changes in angle $\theta_{in}$ for an apparatus of the present invention.
Figure 15:
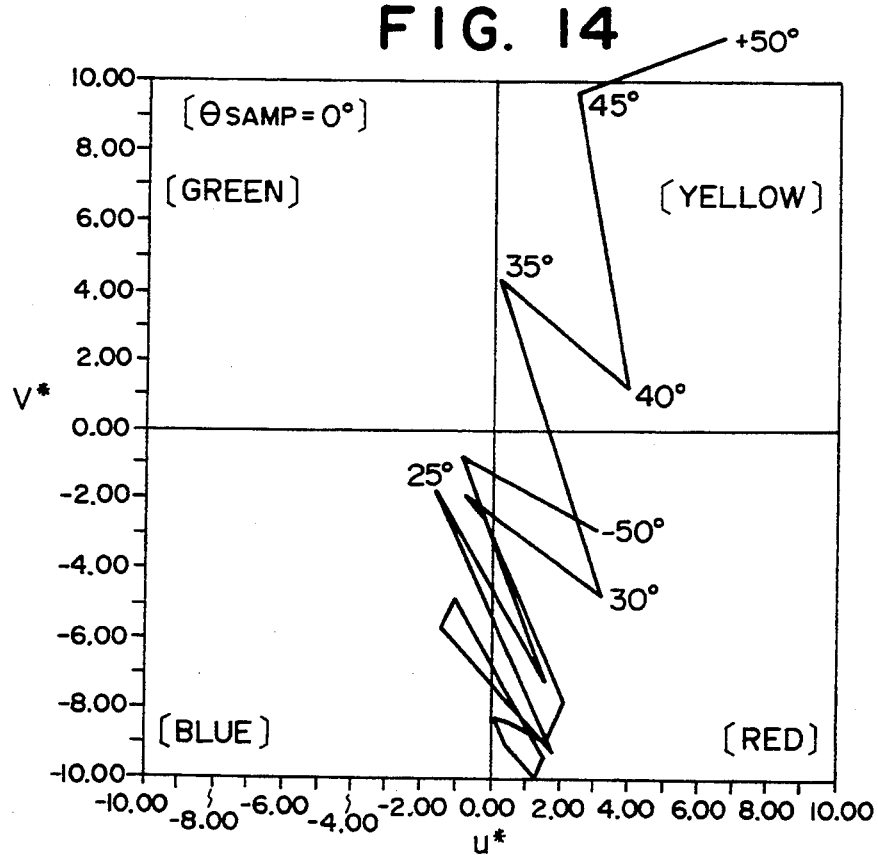
FIG. 15 is a corresponding chromaticity diagram for a comparative apparatus.

FIG. 14 shows the locus of the chromaticity point on the u*-v* coordinate system of Cell B obtained by changing $\theta_{in}$ (FIG. 8B) under the condition of $\theta_{samp}$ (FIG. 8A)=0. FIG. 15 shows the locus of the chromaticity point on the u*-v* coordinate system of Cell A obtained by changing the $\theta_{in}$ under $\theta_{samp}=0$. the numbers (degrees) shown along the loci on FIGS. 14 and 15 denote the numbers in degree of $\theta_{in}$.

FIGS. 12-15 show that the type of Cell B of the present invention does not cause sensitive color change corresponding to changes in cell thickness and viewing angle (incident angle), while the cell of the type of Cell A (comparative) causes a sensitive color change in response to changes in cell thickness and viewing angle.

In other words, it is understood that the cell of the type of Cell A (comparative example) causes a remarkable change in color irregularity or change in hue due to a fluctuation in thickness of ±0.1 micron or less (e.g., ±100 Å) or a change in viewing angle $\theta_{in}$ on the order of ±2.5 degrees, whereas the cell of the present invention does not cause noticeable color irregularity in response to a fluctuation in thickness 0±0.1 micron or less or a change in viewing angle on the order of ±2.5 degrees, thus being a cell not liable to cause color irregularity because an ordinary man has a recognizable pupil parallatic angle of about 2.5 degrees.

In another preferred embodiment of the present invention, the dielectric films 14a and 14b in the ferroelectric liquid crystal cell 10 shown in FIG. 1 may be composed of $Ta_2O_5$ or $TiO_2$ to accomplish the above-mentioned objects.

Figure 16:
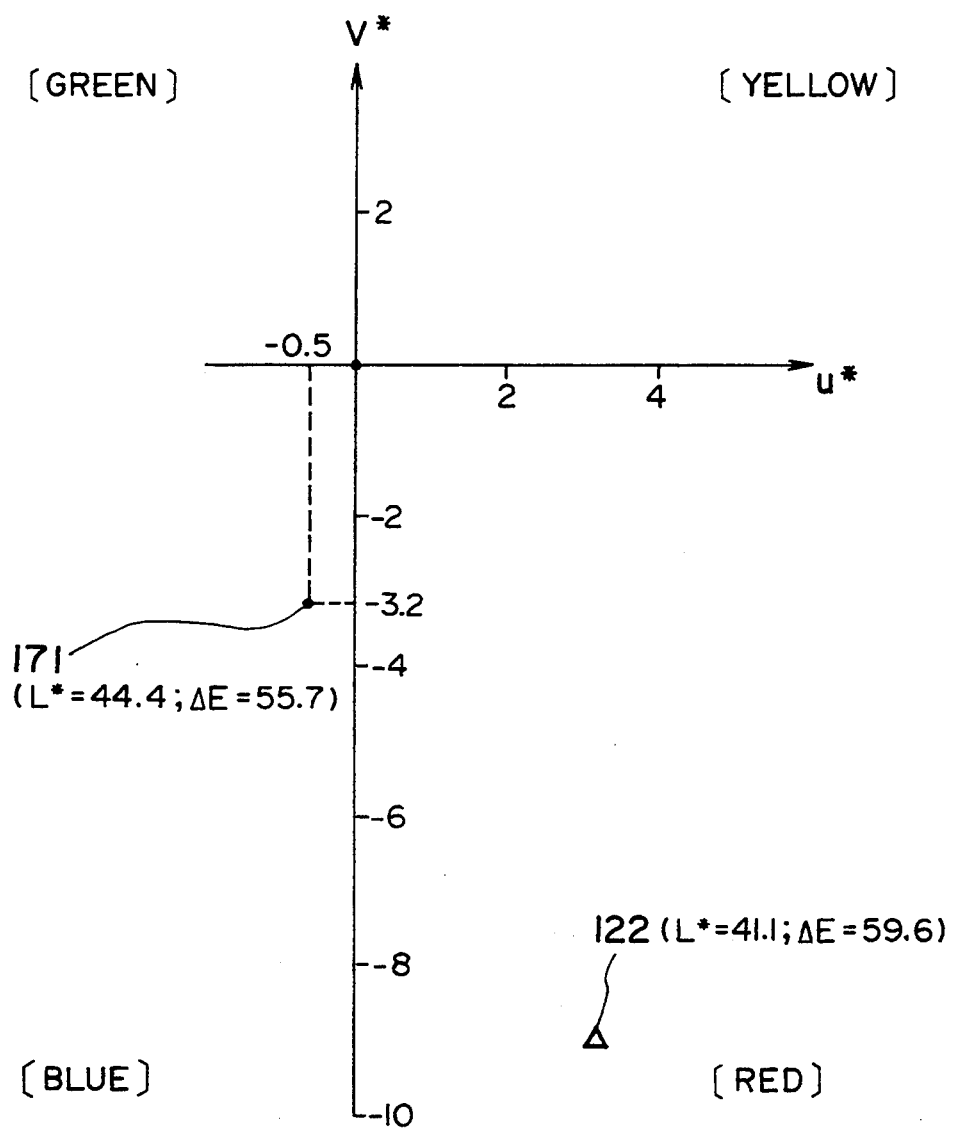
FIG. 16 is a chromaticity diagram on a u*-v* coordinate system showing chromaticity points for an apparatus of the present invention and a comparative apparatus.

FIG. 16 shows a chromaticity point 171 given by such a cell 10 having 630 Å-thick dielectric films 14a and 14b of $Ta_2O_5$ having a refractive index of 2.1 in combination with 670 Å-thick transparent electrodes 13a and 13b of ITO having a refractive index of 1.92.

Figure 17:
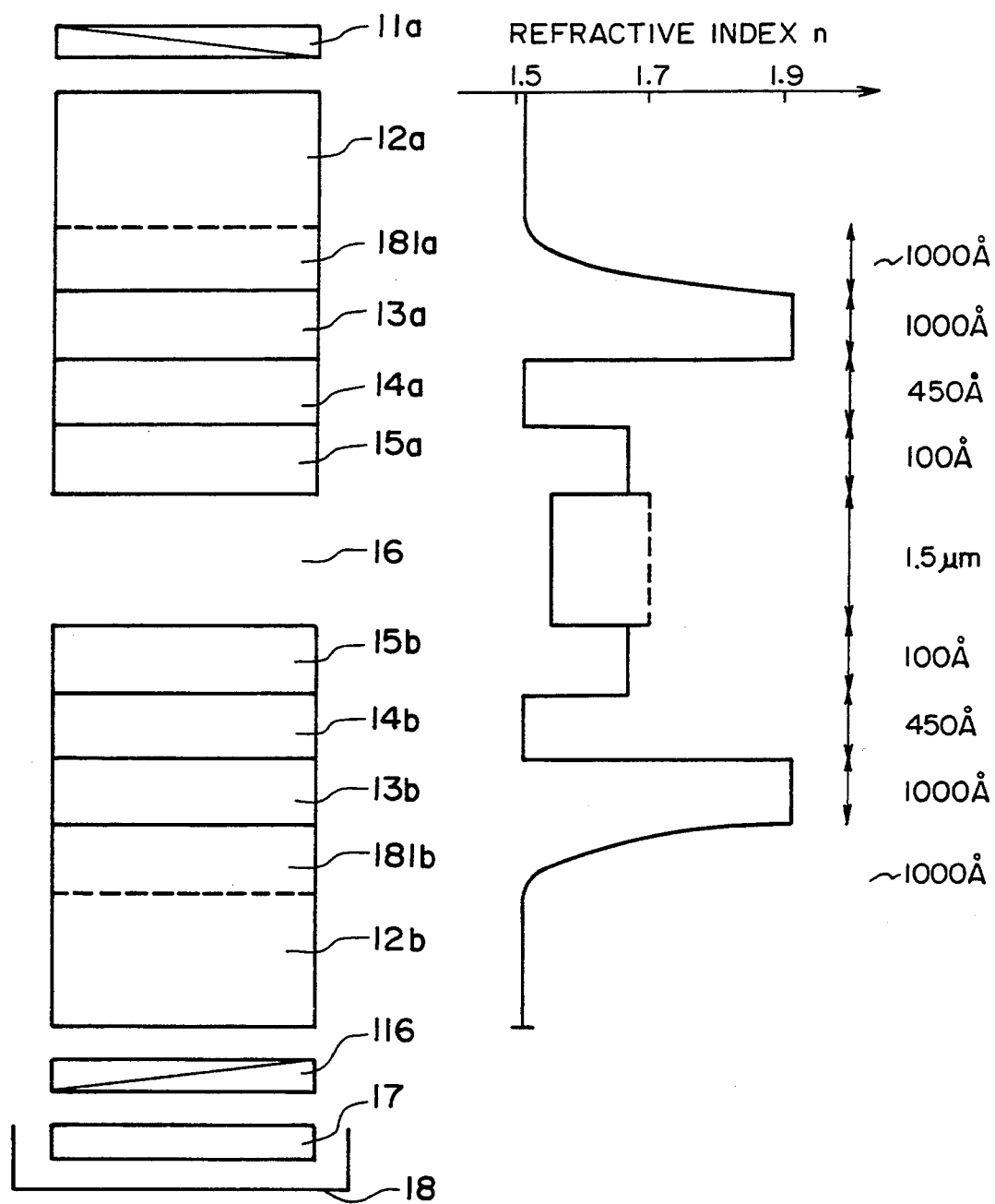
FIG. 17 is a schematic sectional view of another apparatus according to the invention.

In still another preferred embodiment of the present invention, the refractive index of at least a part of the glass substrate, the transparent electrode film and the dielectric film may be changed stepwise or continuously so as to minimize a refractive index difference at a boundary between the layers. FIG. 17 schematically illustrates such an embodiment with its sectional view on the left side and an accompanying refractive index distribution on the right side. Such stepwise or continuous change in refractive index may for example be accomplished by the external diffusion method or the metal diffusion method (see, e.g., "Kohha Denshi Kagaku (Light Wave Electronic Optics)" published from Corona Sha K.K., p.p. 298-299). Specifically, in the embodiment shown in FIG. 7, Ti-diffused glass layers 181a and 181b having a refractive index distribution gradually changing in the direction of thickness were prepared by thermal diffusion of Ti from the surfaces of the glass substrates 12a and 12b. Because of the layers 181a and 181b having gradually changing refractive indices, a particularly problematic boundary reflection at the boundary between the ITO and glass in a comparative cell (Cell A) was minimized to suppress the occurrence of interference peaks attributable to boundary reflection through an entire cell, whereby color irregularity was obviated.

Figure 18:
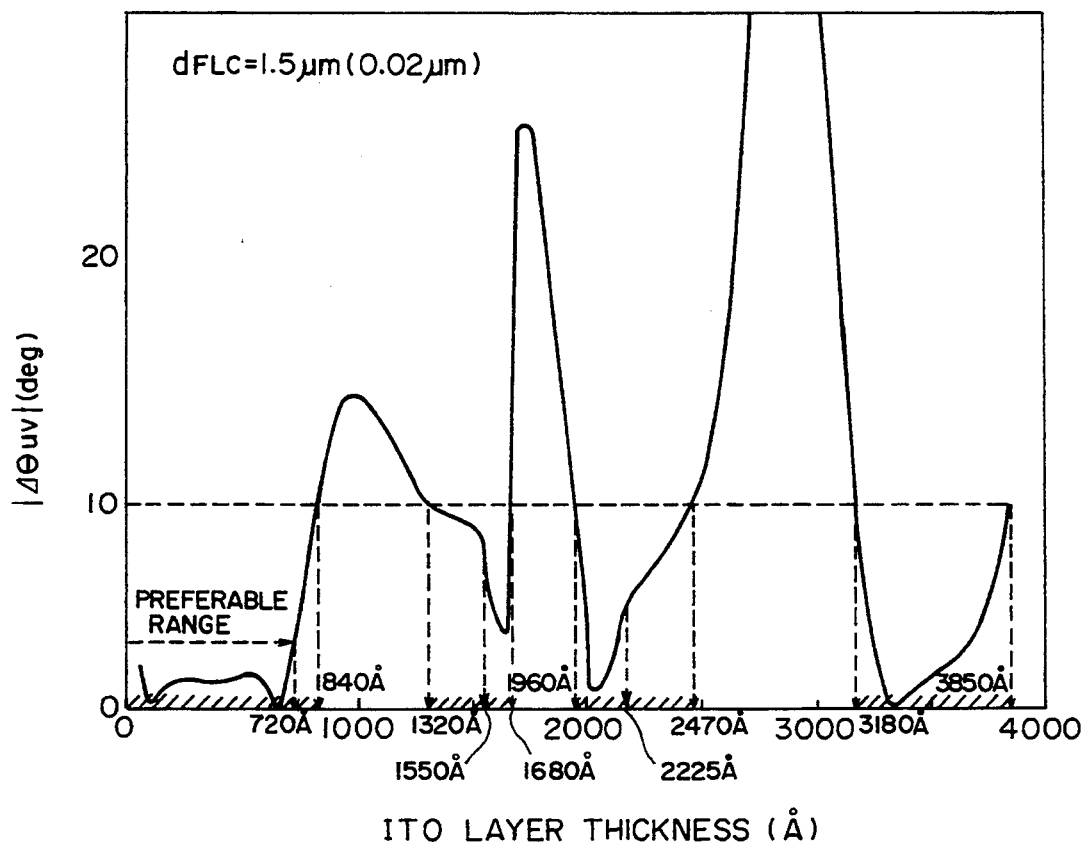
FIG. 18 is a diagram showing a relationship between angle $|\Delta\theta_{uv}|$ (deg.) and ITO film thickness.

FIG. 18 shows changes in $|\Delta\theta_{uv}|$ (deg.) corresponding to changes in thickness of the transparent electrodes 13a and 13b of ITO in various ferroelectric liquid crystal cells 10 (type of Cell B) each having a different electrode thickness. Herein, $|\Delta\theta_{uv}|$ denotes an angle $\angle\theta_{uv.max}.O.\theta_{uv.min}$, wherein $\theta_{uv.max}$ denotes a chromaticity point given by a part of a maximum liquid crystal layer thickness in a cell, $\theta_{uv.min}$ denotes a chromaticity point given by a part of a minimum liquid crystal layer thickness in the cell, and O denotes the original (taken as "white" of the standard light C), respectively, on a u*-v* coordinate system according to the CIE 1976 (L*u*v*) Space. Thus, $|\Delta\theta_{uv}|$ means an angle between a line $O-\theta_{uv.max}$ and a line $O-\theta_{uv.min}$.

According to our experiments, the occurrence of color irregularity was effectively suppressed where $|\Delta\theta_{uv}|$ was 9 degrees or less, preferably 3 degrees or less. For this purpose, the thickness of transparent electrode (ITO) was set to 840 Å or less, 1320-1680 Å, 1960-2470 Å, or 3180-3850 Å. As shown in FIG. 18, the ITO film thickness was particularly preferably in the range of 720 Å or less (but practically 50 Å or more), 1550-1680 Å or 1960-2250 Å. Particularly, cells similar to Cell B but having 1600 Å-thick ITO films and 2000 Å-thick films instead of 100 Å-thick ITO films showed similarly good results as the above-mentioned Cell B.

Figure 19:
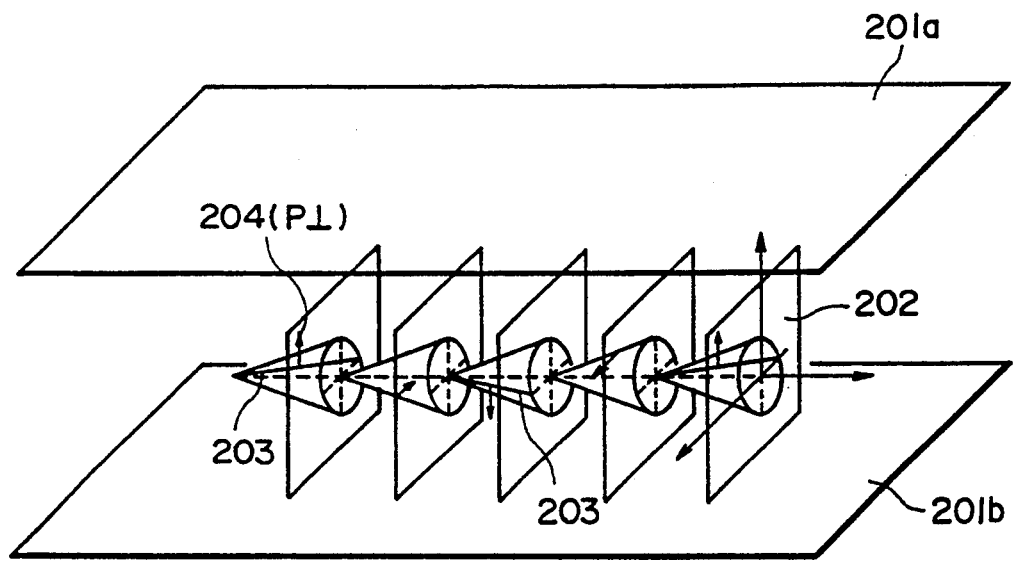
FIGS. 19 and 20 are schematic perspective views for illustrating ferroelectric liquid crystal cell used in the present invention.
Figure 20:
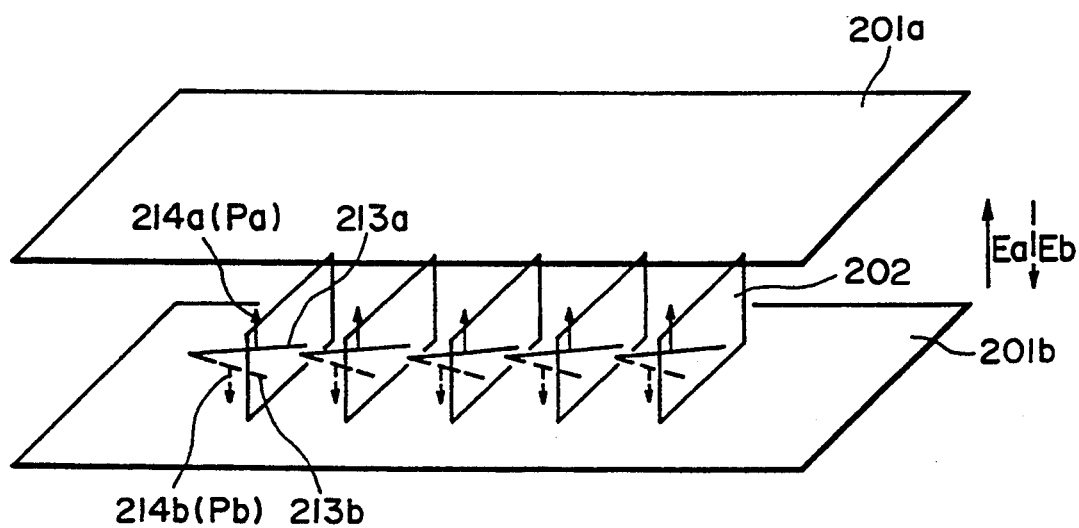

Referring to FIG. 19, there is schematically shown an example of a ferroelectric liquid crystal cell. Reference numerals 201a and 201b denote substrates (glass plates) on which a transparent electrode of, e.g., $In_2O_3$, $SnO_2$, ITO (indium-tin-oxide), etc., is disposed, respectively. A liquid crystal of an SmC*-phase in which liquid crystal molecular layers 202 are oriented perpendicular to surfaces of the glass plates is hermetically disposed therebetween. A full line 203 shows liquid crystal molecules. Each liquid crystal molecule 203 has a dipole moment ($P_\perp$) 204 in a direction perpendicular to the axis thereof. When a voltage higher than a certain threshold level is applied between electrodes formed on the base plates 201a and 201b, a helical or spiral structure of the liquid crystal molecule 203 is unwound or released to change the alignment direction of respective liquid crystal molecules 203 so that the dipole moment ($P_\perp$) 204 are all directed in the direction of the electric field. The liquid crystal molecules 203 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1 micron), the helical structure of the liquid crystal molecules is released without application of an electric field whereby the dipole moment assumes either of the two states, i.e., Pa in an upper direction 214a or Pb in a lower direction 214b thus providing a bistability condition, as shown in FIG. 20. When an electric field Ea or Eb higher than a certain threshold level and different from each other in polarity as shown in FIG. 20 is applied to a cell having the above-mentioned characteristics, the dipole moment is directed either in the upper direction 214a or in the lower direction 214b depending on the vector of the electric field Ea or Eb. In correspondence with this, the liquid crystal molecules are oriented to either a first orientation state 213a or a second orientation state 213b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 20. When the electric field Ea is applied to the liquid crystal molecules, they are oriented in the first stable state 213a. This state is stably retained even if the electric field is removed. On the other hand, when the electric field Eb of which direction is opposite to that of the electric field Ea is applied thereto, the liquid crystal molecules are oriented to the second orientation state 213b whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, further preferably 1 to 5 microns.

In the present invention, it is particularly preferred that the liquid crystal layer thickness is 50 ($x_1+x_2$) or less, more preferably 30 ($x_1+x_2$) or less, further preferably 20 ($x_1+x_2$) wherein $x_1$ and $x_2$ denote the thickness of transparent electrodes on one and the other substrates respectively.

As the bistable liquid crystal used in the liquid crystal apparatus of the present invention, ferroelectric chiral smectic liquid crystals may be most suitably used, of which liquid crystals in chiral smectic C phase (SmC*) or H phase (SmH*) are particularly suited. These ferroelectric liquid crystals may be those described in, e.g., U.S. Pat. Nos. 4,613,209, 4,614,609, 4,622,165, etc.

Further, in the present invention, driving methods as disclosed in, e.g., U.S. Pat. Nos. 4,705,345, 4,707,078, etc. may be used in addition to those described above.

Hereinabove, the present invention has been explained with reference to an embodiment of a ferroelectric liquid crystal. It is however possible to apply the present invention also to a TN-liquid crystal or a super-twist nematic liquid crystal (wherein nematic liquid crystal molecules are aligned with a twist angle of about 270 degrees).

As described above, according to the present invention, it has become possible to suppress the occurrence of color irregularity or change in hue even if a high-luminance three-wavelength light source is used as a backlight.

What is claimed is:

1. A liquid crystal apparatus, comprising:

a liquid crystal cell comprising a pair of substrates each having thereon a transparent electrode with a thickness of 840 Å or less, 1320 to 1680 Å, 1960 to 2470 Å or 3180 to 3850 Å, and a layer of liquid crystal material having a thickness of 5 μm or less disposed between said pair of substrates;

wherein said liquid crystal layer has a maximum thickness $D_{max}$ and a minimum thickness $D_{min}$, and said liquid crystal cell in combination with a light source provides an angle $|\Delta\theta_{uv}|$ of 9 degrees or less formed between a line connecting a coordinate original and a chromaticity point defined by coordinates u* and v* at $D_{max}$ and a line connecting said coordinate original and a chromaticity point defined by coordinates u* and v* at $D_{min}$ on a u*-v* coordinate system according to a (L*u*v*) space of CIE 1976;

said light being a fluorescent light source located behind said liquid crystal cell from a viewing direction thereof that illuminates said liquid crystal cell, with light having at least three peaks of emission energy;

said pair of substrates each having thereon a dielectric film having a larger refractive index than that of said transparent electrode.

2. An apparatus according to claim 1, wherein said pair of substrates have a refractive index n satisfying the relationship of $n\perp - 0.1 \leq n \leq n\| + 0.1$, wherein $n\perp$ is the refractive index along the shorter molecular axis of said liquid crystal and $n\|$ is the refractive index along the longer molecular axis of said liquid crystal material.

3. An apparatus according to claim 1, wherein said transparent electrode has a thickness of 840 Å or less.

4. An apparatus according to claim 1, wherein said transparent electrode has a thickness of 1320 to 1680 Å.

5. An apparatus according to claim 1, wherein said dielectric film comprises $Ta_2O_5$ or $TiO_2$.

6. An apparatus according to claim 1, wherein said liquid crystal material is ferroelectric.

7. An apparatus according to claim 6, wherein said ferroelectric liquid crystal material is in a non-helical molecular alignment structure.

8. An apparatus according to claim 1, wherein said pair of substrates comprises a first substrate having thereon a transparent electrode with a thickness $X_1$ and a second substrate having thereon a electrode with a thickness of $X_2$, wherein said liquid crystal layer has a thickness of 50 ($X_1+X_2$) or below.

9. An apparatus according to claim 8, wherein said liquid crystal layer has a thickness of 30 ($X_1+X_2$) or below.

10. An apparatus according to claim 8, wherein said liquid crystal layer has a thickness of 20 ($X_1+X_2$) or below.

11. An apparatus according to claim 1, wherein said angle $|\Delta\theta_{uv}|$ is 3 degrees or less.

12. An apparatus according to claim 1, wherein said dielectric film has a gradient of refractive index which increases toward the transparent electrode.

* * * * *

UNITED STATES PATENT AND TRADEMARK OFFICE
CERTIFICATE OF CORRECTION

PATENT NO. : 5,414,542
DATED : May 9, 1995
INVENTOR(S) : Hideyuki Kawagishi, et al.

It is certified that error appears in the above-indentified patent and that said Letters Patent is hereby corrected as shown below:

COLUMN 1

Line 15, "p.p." should read --pp.--.

COLUMN 4

Line 3, "(632 nm)." should read --(630 nm).--; and

Line 51, "subjected" should read --subjected to--.

COLUMN 5

Line 15, "the" (second occurrence) should read --The--;

Line 31, "thickness" should read --thickness of--;

Line 35, "parallatic" should read --parallactic--; and

Line 59, "p.p." should read --pp.--.

COLUMN 6

Line 46, "moment" should read --moments--.

COLUMN 7

Line 48, "is however" should read --is, however,--.

UNITED STATES PATENT AND TRADEMARK OFFICE
CERTIFICATE OF CORRECTION

PATENT NO. : 5,414,542
DATED : May 9, 1995
INVENTOR(S) : Hideyuki Kawagishi, et al.

It is certified that error appears in the above-indentified patent and that said Letters Patent is hereby corrected as shown below:

COLUMN 8

Line 46, "a electrode" should read --a transparent electrode--.

Signed and Sealed this

Twenty-second Day of August, 1995

Attest:

BRUCE LEHMAN

Attesting Officer    Commissioner of Patents and Trademarks